United States Patent [19]

Ferrell

[11] Patent Number: 4,836,243
[45] Date of Patent: Jun. 6, 1989

[54] GATE VALVE WITH HYDRAULIC ACTUATOR

[75] Inventor: Kent W. Ferrell, Blooming Grove, Tex.

[73] Assignee: Otis Engineering Corporation, Carrollton, Tex.

[21] Appl. No.: 162,163

[22] Filed: Feb. 29, 1988

[51] Int. Cl.$^4$ .................... F16K 37/00; F16K 31/143
[52] U.S. Cl. ...................... 137/556; 251/14; 251/63.6
[58] Field of Search ............. 137/556; 251/14, 62, 251/63.5, 63.6; /

[56] References Cited

U.S. PATENT DOCUMENTS

| | | | |
|---|---|---|---|
| 2,566,772 | 9/1951 | Otis | 137/153 |
| 2,566,773 | 9/1951 | Otis | 137/153 |
| 2,566,775 | 9/1951 | Otis | 137/153 |
| 2,566,776 | 9/1951 | Otis | 137/153 |
| 2,588,284 | 3/1952 | Otis | 137/153 |
| 2,693,819 | 11/1954 | Otis | 137/458 |
| 3,232,174 | 2/1966 | Grimmer | 91/170 |
| 3,958,592 | 5/1976 | Wells et al. | 251/63.6 X |
| 3,993,284 | 11/1976 | Lukens, Jr. | 251/63.6 |
| 4,087,073 | 5/1978 | Runberg et al. | 251/28 |
| 4,153,072 | 5/1979 | Thompson | 137/467 |
| 4,213,480 | 7/1980 | Orum et al. | 137/556 |
| 4,230,299 | 10/1980 | Pierce, Jr. | 251/14 |
| 4,423,748 | 1/1984 | Ellett | 251/63.6 X |
| 4,445,424 | 5/1984 | Foster et al. | 251/63.6 X |
| 4,585,207 | 4/1986 | Shelton | 251/63.6 X |
| 4,744,386 | 5/1988 | Frazer | 137/556 X |

FOREIGN PATENT DOCUMENTS 0192973 1/1986 European Pat. Off.
1490661 2/1974 United Kingdom.

*Primary Examiner*—John Rivell
*Attorney, Agent, or Firm*—Dennis T. Griggs

[57] ABSTRACT

A hydraulic actuator for controlling the operation of a safety valve actuates automatically upon loss of control pressure. The hydraulic chamber of the actuator is sealed by static annular seals which bear against polished external surfaces of an indicator stem and a cylindrical piston, respectively. The piston is connected by a threaded coupling to the valve stem to accommodate assembly and drift alignment of the gate bore with the safety valve bore. A threaded rod is pinned to the valve stem and is received within an axial pocket of the piston. The piston is movably coupled to the threaded rod by a collar which has inside diameter threads and outside diameter threads. The valve stem static seal is retained within a smooth counterbore formed on the coupling bonnet by a packing collar. The packing collar also serves as a seating stop for the piston and is axially adjustable within the coupling bonnet during assembly onto a safety valve for establishing smooth bore alignment of the gate bore with the safety valve bore.

7 Claims, 2 Drawing Sheets

GATE VALVE WITH HYDRAULIC ACTUATOR

FIELD OF THE INVENTION

This invention relates to a hydraulic actuator for controlling the operation of a safety valve which is designed to actuate automatically upon loss of control pressure.

BACKGROUND OF THE INVENTION

Formation fluids including oil and gas produced at a well head are conveyed through flow lines to remote gathering stations. It is conventional practice to use safety valves which are responsive to a number of different changes in operating conditions to automatically shut off flow at the onset of unusual or unscheduled operating conditions. For example, conventional oil and gas gathering systems include safety valves which are designed to automatically close in the event of fluctuations either above or below predetermined settings, such as high and low liquid levels, high and low temperatures, and electrical power loss. Also, catastrophic failures may occur in which flow lines are broken by explosion, storm damage and the like, creating sudden decreases in flow line pressure.

It is desirable to be able to completely close off flow in the event of damage or breakage of the flow line to prevent waste of the well fluids or environmetal contamination. Moreover, it is desirable to be able to shut off flow if the pressure in the flow line rises above a predetermined level for any reason, such as an increase in well pressure or a downstream blockage in the flow conductor. In many such operations, the production fluids are conveyed under high pressure from a well which is in a relatively inaccessible location, such as a platform over a body of water or which may become inaccessible due to weather conditions.

DESCRIPTION OF THE PRIOR ART

Conventional safety valves which are commonly used in oil and gas flow systems include valve members for controlling flow which are connected with a hydraulic piston adapted to respond to fluid pressure for opening and closing the safety valve. Surface safety valves are installed as a secondary master valve on a well head tree, as a wing valve, in flow lines, on header valves, gathering lines and cross country pipelines. In pilot assisted forms of such safety valves, the hydraulic piston as well as the valve member operate in response to the pressure of the fluid being controlled so that a sudden, substantial pressure drop at the safety valve will result in closing the valve. Such valves use a pilot valve which responds to the pressure change in the well fluids to immediately release the safety valve control pressure so that the safety valve will close.

In another form of hydraulically operated safety valves, an independent source of control pressure is applied to the piston in response to sensing a condition such as pressure changes at a remote location. Such remotely controllable safety valves are useful for controlling the flow from wells which are located in relatively inaccessible locations. Such remotely controlled valves are designed to actuate automatically upon loss of control pressure.

The remotely controlled surface safety valve is a hydraulically controlled valve that is operated by a closed hydraulic system which can be operated completely independent of well fluids and pressures. The hydraulic surface safety valve is designed to be held open by hydraulic control pressure acting on an actuator piston. Loss of hydraulic pressure in the actuator cylinder permits the well or flow line pressure, acting on the gate of the lower stem, together with the force exerted by a closing spring, to drive the gate into a closed position.

Various monitoring devices and pilots can be installed in combination with such valves in a system where damage could cause main flow line pressure to fluctuate. In many oil and gas installations, the production fluids may contain abrasive materials, paraffin products and corrosive fluids, and may include highly corrosive, toxic gases such as hydrogen sulfide. Accordingly, well pressure should be contained in the valve body and not vented to the atmosphere.

Hydraulic surface safety valves must operate for extended periods without activity other than maintaining an open bore through the main flow line, and must be capable of rapidly shutting off the flow in response to loss of control pressure. That is, the actuator's moving parts and seals must operate quickly and reliably after extended periods of inactivity and exposure to extreme weather conditions and corrosive flow line fluids. For these reasons, the internal components of the actuator are constructed of high strength, corrosion resistant materials, and must have fine dimensional tolerances, especially for those components which perform a sealing function.

It has been customary to construct certain components of the actuator, such as the piston and valve stem, of a corrosion resistant, hardenable alloy such as K Monel. Additionally, it has been customary to hone and polish the bore of the hydraulic cylinder to a 16–25 RMS finish to achieve a reliable fluid seal between packing carried by the piston and the polished bore of the hydraulic cylinder. The machining of the inside diameter bore of the hydraulic cylinder is difficult and expensive to produce. In such a surface finishing procedure, the cylinder is set up on a lathe and rotated while a honing tool is inserted through its bore. Because the honing tool must be extended for up to 12 inches or more, as honing pressure is exerted, the honing tool will deflect. The longer the reach of the tool, the more deflection will be encountered, which results in less control to the final finish, which reduces production yield and increases manufacturing costs.

Surface safety valves are manufactured and assembled to meet ANSI/ASME standards and API specifications for various applications. The hydraulic actuators are also manufactured and assembled according to the same standards and specifications, but with dimensions to accommodate the various service classes. During the initial assembly of the actuator valve stem to the gate, the seating position of the actuator piston must be carefully adjusted to provide concentric alignment of the gate bore with the safety valve bore. The deviation of the gate from smooth bore alignment is referred to as "drift", and the initial drift encountered upon installation is the result of cumulative manufacturing tolerances in the actuator components. Smooth bore alignment of the gate is necessary to avoid flow obstruction through the safety valve, and to permit tools to be run through the bore of the fluid line and through the safety valve.

Examples of prior art hydraulic actuator and safety valve constructions are disclosed in U.S. Pat. Nos.

2,566,772; 2,566,773; 2,566,775; 2,566,776; 2,588,284; 2,693,819; 3,232,174; 4,087,073; and 4,153,072.

OBJECTS OF THE INVENTION

The principal object of the present invention is to provide an improved hydraulic actuator for use in combination with a fluid flow safety valve.

A related object of the invention is to simplify the construction and improve operational reliability of hydraulic actuators for use in combination with surface safety valves.

A general object of the invention is to provide an improved hydraulic actuator which is operable to close a safety valve automatically upon loss of control pressure.

Yet another object of the invention is to provide a hydraulic actuator of the character described having improved means for adjusting the drift of a safety valve gate.

Still another object of the invention is to simplify manufacture and assembly of a hydraulic actuator of the character described.

SUMMARY OF THE INVENTION

A valve actuator for use in combination with a fluid flow control valve of the type having a valve body and a valve closure member includes a piston received within a power cylinder, with a hydraulic chamber being sealed by a static annular seal mounted and retained on the inside diameter bore of the cylinder housing. The external surface of the piston is polished for slideable, sealing engagement against the static seal. The piston is connected to the valve closure member by a threaded coupling which engages an all thread rod portion of a gate valve stem.

The seating position of the piston is established by a threaded packing collar which is adjustably mounted onto an actuator bonnet. Precise adjustment of the seating position of the piston in accurate alignment of the gate bore with the valve flow line bore is established by setting the axial position of the packing collar with a drift bar inserted through the valve bore and open gate bore, and thereafter threading the piston onto the all thread rod and torquing it into engagement with the packing collar, which defines the limit of its extension movement.

In the preferred embodiment, the actuator piston has an axially extending, threaded pocket, with a threaded rod received within the pocket and coupled to the piston by a collar having inside threads and outside threads. In addition to accommodating fine adjustment of gate drift, the threaded coupling arrangement between the valve stem and the piston minimizes the number of actuator components which must be fabricated from relatively expensive, corrosion resistant alloys such as K Monel. That is, in the preferred embodiment, the only actuator component which is exposed to flow line fluids is the valve stem which is machined from a corrosion resistant alloy such as K Monel. Because the valve stem is sealed by a static seal mounted within the actuator bonnet, the remaining internal components of the actuator are fabricated of relatively inexpensive, high strength materials which are more easily machined, such as stainless steel.

A substantial cost savings is realized by the use of static seals for sealing the annulus between the actuator housing and the piston, between the bonnet and valve stem, and between the indicator stem and the actuator cap. Each of the foregoing static seals are mounted and retained upon polished counterbore surfaces. The polished counterbore surfaces are honed to a 63 RMS finish over a very limited counterbore area, while the external cylindrical surfaces of the valve stem, piston and indicator stem are honed to a 32 RMS finish. The substantial cost savings is realized since most of the honing and polishing operations are carried out primarily on the external cylindrical surfaces of the valve stem, piston and indicator stem, while the more difficult and more costly honing of the inside diameter counterbore surfaces are limited to the static seal seating surfaces.

The superior features and advantages or the present invention will be further appreciated by those skilled in the art upon reading the detailed description which follows in conjunction with the attached drawings.

DETAILED DESCRIPTION OF THE PREFERRED EMBODIMENT

Figure 1:
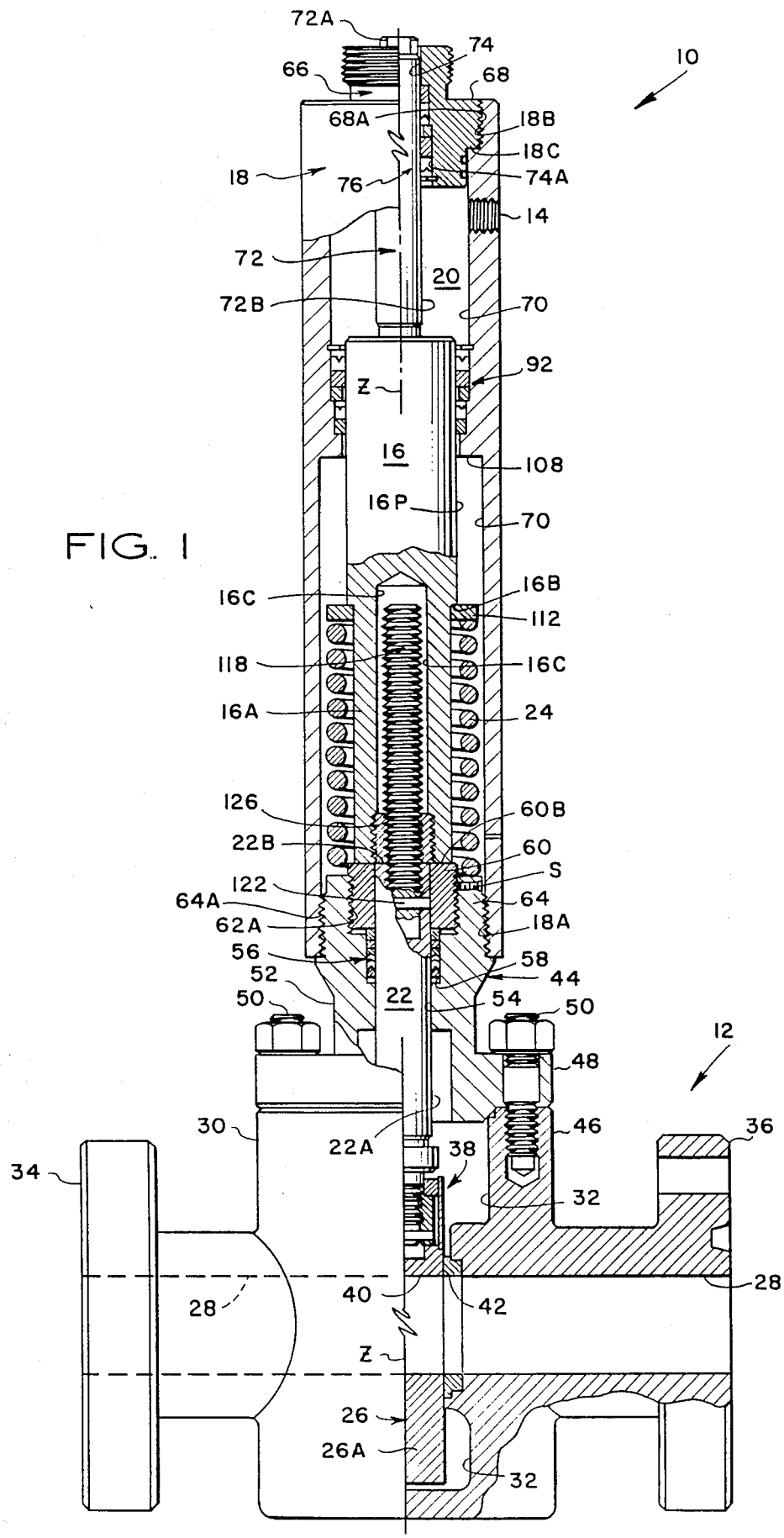
FIG. 1 is an elevation view, partly in section, of a hydraulic actuator assembled onto a surface safety valve.

In the description which follows, like parts are indicated throughout the specification and drawings with the same reference numerals, respectively. The drawings are not necessarily to scale and the proportions of certain parts have been exaggerated to better illustrate details of the invention.

Referring now to FIG. 1 of the drawings, a hydraulic actuator 10 is assembled onto a safety valve 12 which is designed for controlling the transmission of fluids through a flow line from a source, such as a well, to a location remote from the source, such as a tank. The safety valve 12 is adapted for connection into the flow line adjacent the well for shutting off flow through the flow line at the well in the event that the pressure in the flow line downstream of the safety valve exceeds a predetermined value or decreases below a predetermined value. The actuator 10 is designed to close the safety valve 12 upon loss of control pressure which is applied to the hydraulic actuator through an inlet port 14.

The hydraulic actuator 10 is operated by a closed hydraulic system which can be operated completely independent of flow line pressures. The safety valve 12 is held open by hydraulic pressure acting on an actuator piston 16. The piston 16 is housed within a power cylinder 18 which encloses a variable volume hydraulic pressure chamber 20. Loss of hydraulic pressure within the pressure chamber 20 permits flow line pressure acting on the gate stem 22 in combination with a bias force exerted by a closing spring 24 to retract the piston and move the valve gate 26 to a position which blocks the flow through the safety valve bore 28.

According to this arrangement, the safety valve 12 can be installed adjacent to a well head, and is controllable from a location remote from the well by the application of hydraulic control pressure into the pressure chamber 20.

The bore 28 of the safety valve 12 provides a longitudinal flow passage for connection into a flow line. The safety valve 12 includes a body portion 30 through which the longitudinal bore 28 is formed, and in which a gate cavity 32 is formed. The valve body may be rigidly connected to flow line sections by connector bolts which extend through aligned apertures in flanges 34, 36.

The gate cavity 32 intersects the longitudinal flow passage 28. The valve gate 26 is slideably received within the gate cavity 32 and is coupled to the valve stem 22 by a threaded coupling 38. The valve gate 26 includes an aperture 40 which is illustrated in bore alignment with the longitudinal flow passage 28 of the safety valve. The position of the gate and piston as illustrated in FIG. 1 corresponds with the piston being in the extended, seated position, with the pressure chamber 20 fully charged.

Upon release of pressure from the pressure chamber 20, the piston is retracted into the pressure chamber 20 in response to the closing force applied by the bias spring 24, together with the hydraulic pressure developed by flow line fluid entering the gate cavity 32 and being applied against transverse surfaces of the valve stem 22. According to this arrangement, flow line fluids accumulate within the gate cavity 32, rather than being discharged into the surrounding atmosphere. The gate 26 includes a solid body portion 26A which engages an annular sealing ring 42 for blocking flow through safety valve bore 28 as the piston 16 is fully retracted. The closing spring 24 is designed to retract the piston and gate independently of flow line pressure in the gate cavity 32.

The hydraulic actuator 10 includes a bonnet 44 for coupling the actuator onto the safety valve 12. The safety valve body has a coupling collar 46 concentric with the gate cavity 32 for engaging the bonnet 44. The bonnet 44 is provided with an annular flange 48 which is secured onto the coupling collar 46 by threaded bolt connectors 50.

The coupling bonnet 44 has a body portion 52 through which a smooth valve stem bore 54 is formed. The valve stem 22 has a polished, cylindrical surface 22A which extends through the bonnet bore 54 and bears in sealing engagement against a static annular packing seal 56. The bonnet bore 54 is enlarged by a polished counterbore 58, and the annular packing seal 56 is retained within the polished counterbore 58 as a static seal assembly.

Figure 2A:
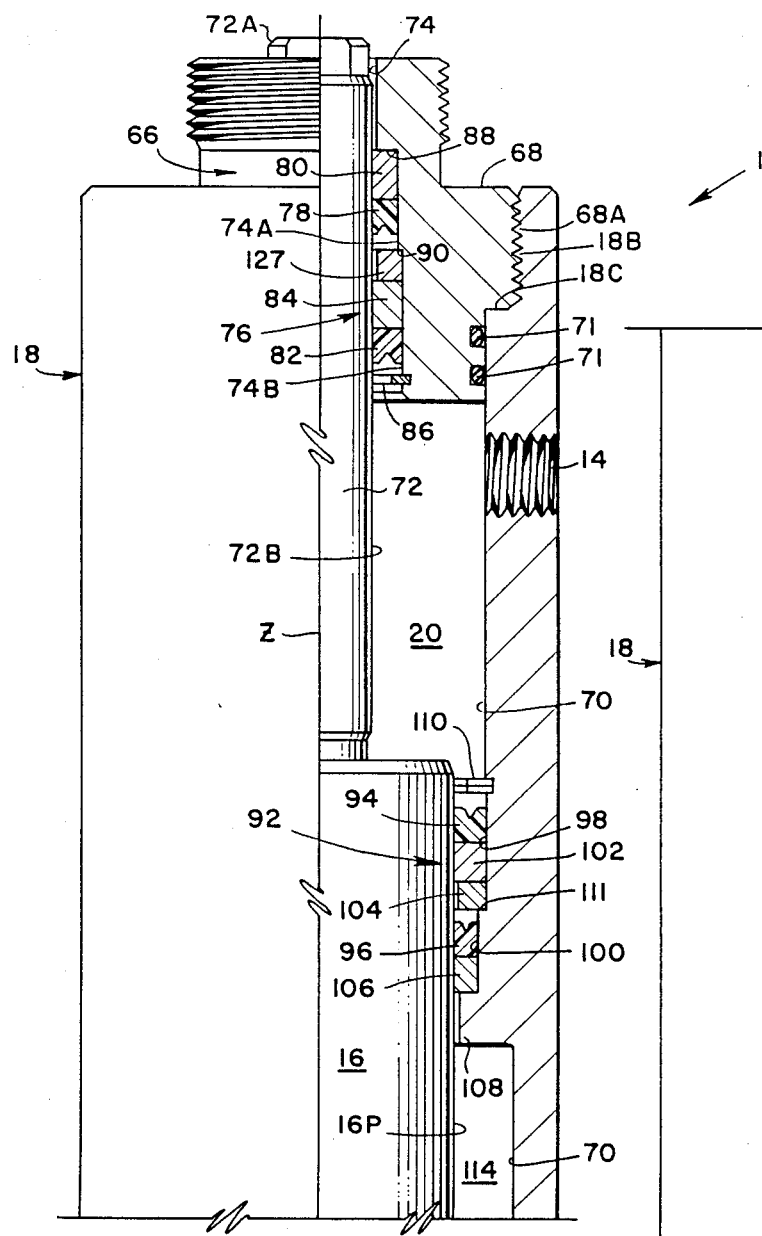
FIGS. 2A and 2B are enlarged elevational views, partly in section, of the hydraulic actuator shown in FIG. 1.
Figure 3:
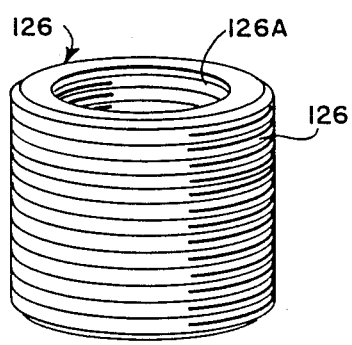
FIG. 3 is a perspective view of a threaded coupling collar shown in section in FIG. 2B.
Figure 2B:
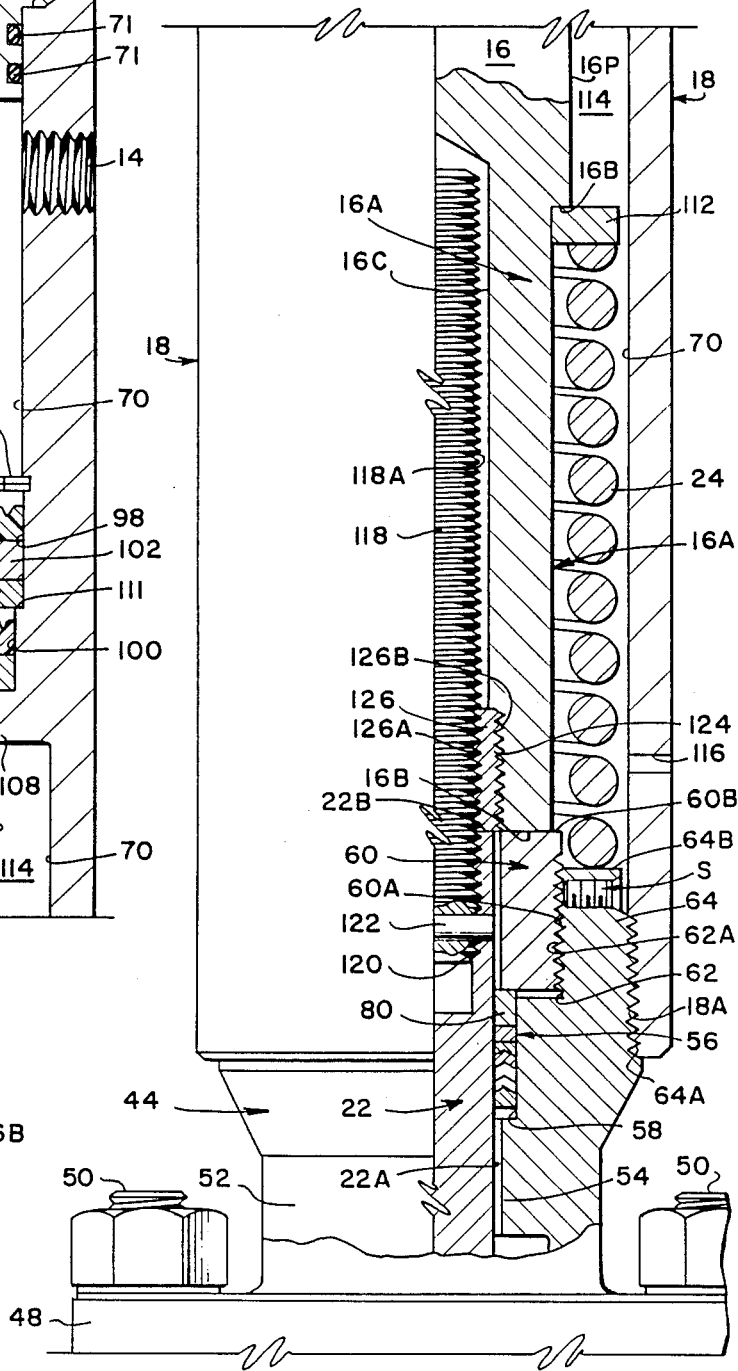

As shown in FIG. 2B, the static seal assembly 56 is retained within the polished counterbore 58 by a drift ajustment packing collar 60. The bonnet bore 54 is enlarged by a counterbore 62 which is concentric with the valve stem bore 54. The counterbore 62 has internal threads 62A and the drift adjustment collar 60 has mating external threads 60A. After the packing seal 56 has been inserted in the polished bore 58, the drift adjustment collar 60 is screwed into the threaded counterbore 62, thereby retaining the packing seal 56 within the smooth counterbore 58. Engagement of the static packing seal 56 against the polished external surface 22A of the valve stem produces a fluid seal to prevent exposure of the actuator internal components to flow line fluids which accumulate within the gate cavity 32.

The bonnet body 52 is provided with an annular coupling collar 64 which bears external threads 64A. The actuator cylinder 18 has internal threads 18A disposed in threaded engagement with the coupling collar 64. According to this arrangement, the actuator 10 is supported in an upright orientation with respect to the safety valve 12, with the valve stem being positioned in alignment with the gate closure member 26.

The upper end of the actuator cylinder 18 is provided with internal threads 18B for receiving a cap 66. The cap 66 has a body portion 68 on which external threads 68A are formed. The cap 66 is screwed into the threaded open end of the cylinder 18 until it engages an annular shoulder 18C. The cap body 68 is sealed against the cylinder bore 70 by rubber O-ring seals 71.

According to an important feature of the invention, an indicator stem 72 extends from the upper end of the piston 16 through the pressure chamber 20. A bore 74 is formed in the body of cap 66 in alignment with the longitudinal axis Z of the piston 16. The indicator stem 72 projects through the cap bore 74 for providing an indication of the safety valve operating mode. In the preferred embodiment, the indicator stem 72 is integrally formed with the piston 16.

In the valve open mode, the terminal end 72A of the indicator stem 72 is barely visible, but when the safety valve has been actuated to the valve closed position, the polished external surface 72B of the operator stem will project substantially above the cap 66 to indicate and verify the closed position of the gate. The terminal end portion 72A is machined for engagement by a wrench so that the piston 16 can be rotated within the cylinder 18 to pre-load the return spring 24.

The indicator stem 72 has a cylindrical, external polished surface 72B which engages in sealing relation with an annular packing assembly 76. According to an important feature of the invention, the annular packing assembly 76 is a static seal which is engaged against and retained on a polished counterbore 74A formed on cap body 68.

As can best be seen in FIG. 2A, the annular packing assembly 76 comprises first and second redundant seals. The first annular seal is an elastomeric seal ring 78 supported axially by a polymer backup ring 80. The second seal is provided by an elastomeric seal ring 82 which is supported axially by a polymer backup ring 84 and a metal packing spacer 127. The first seal is received within a polished counterbore 74A, and the second packing is received within a polished counterbore 74B. The packings are retained between a metal spiral ring 86 and radial shoulders 88, 90.

The external cylindrical surface of the indicator stem 72 is smoothed and polished to produce a finish of 32 RMS, and since the packing assembly is static, the counterbores 74A and 74B are machined and polished to a 63 RMS finish. The engagement of the polished external cylindrical surface of the indicator stem 72 against the packing assembly 76 seals the interface between the indicator stem 72 and the cap 66, thereby sealing the upper end of the hydraulic pressure chamber 20.

The lower boundary of the variable volume pressure chamber 20 is fixed and sealed by a static redundant packing assembly 92. The redundant packing assembly 92 includes first and second elastomeric seal rings 94, 96 which are received within polished counterbores 98, 100, respectively. Because the packing assembly 92 is static, the polished counterbores 98, 100 are honed to a 63 RMS finish. The elastomeric seal rings 94, 96 are separated by a polymer backup ring 102, a metal packing spacer 104, and another polymer backup ring 106. The packing assembly 92 is confined axially between an annular shoulder 108 which projects radially into the chamber 20, and a metal spiral ring 110 which is compression fitted within an annular notch formed in the sidewall of cylinder 18.

The elastomeric seal ring 94 is received within smooth counterbore 98 between the spiral ring retainer 110 and the polymeric backup ring 102. The smooth counterbore 98 is formed on the inside diameter of the cylinder 18 and is honed to a 63 RMS finish. Likewise, the elastomeric seal ring 96 is received within smooth counterbore 100 between packing spacer 104 and polymer backup ring 106. The smooth counterbore 100 is also honed to a 63 RMS finish. The smooth counterbore 98 is radially stepped with respect to the smooth counterbore 100, thereby defining a radial shoulder 111. According to this arrangement, compression loads cannot be transmitted through one seal to the other, so that one seal cannot be deformed by compression loads imposed on the other.

The piston 16 has a polished external cylindrical surface 16P which is honed to a 32 RMS finish. The slideable, sealing engagement of the polished external cylindrical surface 16P of the piston 16 against the redundant packing assembly 92 provides a secure static seal which forms the lower boundary of the variable volume hydraulic pressure chamber 20.

The closing spring 24 is fitted about a reduced diameter piston portion 16A. The closing spring 24 is confined between a retainer ring 112 which rides against the reduced diameter piston portion 16A and a radial shoulder 16B. The lower end of the closing spring 24 bears against the annular face 64B of the coupling collar 64. The closing spring 24 is enclosed within an unpressurized annulus 114 between the piston 16 and cylinder bore 70. The annulus 114 is relieved to atmospheric pressure by a vent bore 116 formed in the cylinder wall 18.

According to an important feature of the invention, the drift adjustment collar 60 is adjustably connected to the actuator bonnet 44 to establish the seating position of the piston 16. The drift adjustment collar 60 is rotated clockwise and counterclockwise to adjust its axial position by small amounts to limit extension of the piston 16.

According to the method of the present invention, a cylindrical drift bar is inserted into the bore 28 of the valve 12 with the gate bore 40 of gate 26 in the down and open position as shown in FIG. 1. With the drift bar in registration with the gate bore 40 and the valve bore 28, the drift adjustment collar 60 is turned within the threaded counterbore 62A until its annular face 60B is flush with the annular face 22B of valve stem 22. The flush position of drift adjustment collar 60 is locked by set screw S. Next, the piston sleeve 16A is threaded onto a threaded coupling rod 118.

The coupling rod 118 is received within a piston pocket 16C which extends coaxially with the longitudinal axis Z of the piston. The upper end of the valve stem 22 is provided with a threaded counterbore 120 in which the lower end of the coupling rod 118 is received in threaded engagement. Additionally, the lower end of the coupling rod 118 is rigidly locked within the threaded counterbore 120 by a pin 122.

The lower end of the piston pocket 16C is enlarged by a threaded counterbore 124, and the piston is movably coupled to the threaded rod 118 by a coupling collar 126. The coupling collar 126 carries internal threads 126A and external threads 126B. According to this arrangement, the threaded coupling collar is interposed in the annulus between the coupling rod 118 and the reduced diameter piston sleeve 16A. The coupling collar 126 is torqued tightly and bonded against the reduced diameter piston portion 16A and the external threads 126B are reversed with respect to the internal threads 126A whereby the coupling collar 126 is constrained to travel with the reduced diameter piston portion 16A as it is turned about axis Z within the cylinder 18. Rotation of the piston 16 is produced by applying torque to the operator stem fitting 72A with a wrench. That is, as the piston is being assembled onto the coupling rod 118, the coupling collar 126 engages the threads 118A of the coupling rod 118 and advances down the coupling rod as the piston 16 is rotated, thereby comprising return spring 24.

During the initial set up, after the axial position of the drift adjustment collar 60 has been properly set to secure smooth bore alignment of gate bore 40 with valve bore 28, its position is locked by a set screw S. Thereafter, the piston 16 is threaded onto the all thread rod 118 and the cylindrical housing 18 is coupled onto the bonnet 44 with the return spring 24 in place between the retainer ring 112 and the bonnet annular face 64B. As the piston 16 is rotated, the reduced diameter piston sleeve 16A travels down the all thread rod 118 until it is seated into engagement with the annular face 60B of the drift adjustment collar 60. Thereafter, extension movement of the piston 16 is limited by engagement with the drift adjustment collar 60, which causes the gate bore 40 to be held in smooth bore alignment with the valve bore 28 when the piston 16 is fully extended.

Although the invention has been described with reference to a specific hydraulic actuator embodiment, and with reference to a particular safety valve application, the foregoing description is not intended to be construed in a limiting sense. Various modifications of the disclosed embodiment as well as alternative applications of the invention will be suggested to persons skilled in the art by the foregoing specification and illustrations. It is therefore contemplated that the appended claims will cover any such modifications or embodiments that fall within the true scope of the invention.

What is claimed is:

1. A valve actuator for use in combination with a fluid flow control valve of the type including a valve body having a fluid flow passage and a valve closure member movable between first and second positions for opening and closing said fluid flow passage, respectively, said valve actuator comprising:

a housing adapted for connection to the valve body, said housing having a pressure chamber and a flow port communicating with said pressure chamber for permitting the flow of control fluid into and out of said chamber;

a piston disposed in said pressure chamber for extension and retraction, said piston having an axially extending bore defining a pocket and having an axially extending threaded counterbore enlarging said pocket;

a valve stem coupled to said piston, said valve stem being adapted for attachment to said valve closure member; and, positioning means disposed within said piston pocket for coupling said piston to said valve stem, said positioning means including a threaded coupling rod and a piston coupling collar disposed within the piston pocket, said piston coupling collar having inside diameter threads and outside diameter threads, said piston coupling collar being disposed in threaded engagement with said threaded rod and threaded piston counterbore, respectively, and said threaded rod being connected to said valve stem.

2. A valve actuator as defined in claim 1, said valve stem having an axially extending, threaded bore, and said threaded rod being disposed in threaded engagement with the threaded bore of said valve stem.

3. A valve actuator as defined in claim 1,
said valve stem having an annular face adapted for engagement against said piston;
said housing including a valve coupling bonnet having a valve stem passage aligned with said piston, said valve stem being received within said valve stem passage and projecting through said coupling bonnet; and,
said coupling bonnet having a threaded counterbore aligned with said valve stem passage, including a threaded drift adjustment collar disposed in threaded engagement with said threaded counterbore, said drift adjustment collar having an annular face defining a seat engagable by said piston, the axial position of said drift collar being adjustable relative to said bonnet and settable to maintain flush surface alignment of said drift collar face with said valve stem face.

4. A valve actuator for use in combination with a fluid flow control valve of the type including a valve body having a fluid flow passage and a valve closure member movable between first and second positions for opening and closing said fluid flow passage, respectively, said valve actuator comprising:
a housing adapted for connection to the valve body, said housing having a pressure chamber and a flow port communicating with said pressure chamber for permitting the flow of control fluid into and out of said chamber;
a piston disposed in said pressure chamber for extension and retraction, said piston having an axially extending bore defining a pocket and having a threaded counterbore enlarging said pocket;
positioning means received within said piston pocket for adjustably coupling said piston to said valve stem, said positioning means including a threaded coupling rod and a coupling collar disposed within the piston pocket, said coupling collar having inside diameter threads and outside diameter threads, said coupling collar being disposed in threaded engagement with said threaded rod and threaded piston counterbore, respectively, and said threaded rod being attached to said valve stem;
a drift adjustment collar movably mounted on said housing, said drift adjustment collar having an annular face engagable with said piston and thereby defining a stop for limiting extension of said piston, and having a valve stem passage; and,
a valve stem attached to said piston, said valve stem having an end portion extending through said valve stem passage and adapted for attachment to said valve closure member.

5. A valve actuator as defined in claim 4, said valve stem having an axially extending, threaded bore, and said threaded rod being disposed in threaded engagement with the threaded bore of said valve stem.

6. A valve actuator for use in combination with a fluid flow control valve of the type including a valve body having a fluid flow passage and a valve closure member movable between first and second positions for opening and closing said fluid flow passage, respectively, said valve actuator comprising:
a bonnet adapted for coupling engagement onto the fluid flow control valve, said bonnet having a valve stem bore, a smooth counterbore and a threaded counterbore, and having an externally threaded collar portion;
a power housing having a pressure chamber and a cylindrical sidewall enclosing said pressure chamber between first and second internally threaded end portions, with one internally threaded end portion being disposed in threaded engagement with the threaded collar portion of said bonnet;
a cap received in threaded engagement with the opposite threaded end portion of said cylinder, said cap having a central bore and a smooth counterbore;
an indicator stem received within said power housing, said indicator stem having a first end portion projecting through the bore of said cap, and having a second end portion attached to said piston, said indicator stem having a polished, external sealing surface;
a piston received within said power housing and attached to said indicator stem, said piston having a threaded bore and a polished, external sealing surface;
a valve stem projecting through the bore of said bonnet, said valve stem having a polished, external sealing surface;
a threaded rod received within the piston pocket, said threaded rod being attached to said valve stem;
a collar having internal and external threads coupling said threaded rod to the threaded bore of said piston;
a threaded packing collar being received within the threaded counterbore of said bonnet, said packing collar having an annular face engagable by said piston;
an annular bonnet seal being received within the smooth counterbore of said bonnet, and said annular bonnet seal being disposed in slideable, sealing engagement with the polished external surface of said valve stem and being retained in said smooth counterbore by said threaded packing collar;
said cylindrical housing having an annular shoulder projecting radially into the housing chamber, said housing cylinder having a smooth counterbore adjoining said annular shoulder, and having an inlet port in communication with said pressure chamber for permitting the flow of control fluid into and out of said pressure chamber;
an annular housing seal disposed within the smooth counterbore of said housing, said annular housing seal being disposed in slideable, sealing engagement with the polished external surface of said piston; and,
an annular cap seal received within the polished counterbore of said cap, the polished surface of said indicator stem being disposed in slideable, sealing engagement with said annular cap seal.

7. A valve actuator for use in combination with a fluid flow control valve of the type including a valve body having a fluid flow passage, a valve closure member movable between first and second positions for opening and closing said fluid flow passage, respectively, and a coupling bonnet connected to said valve body, said bonnet having a valve stem passage and a threaded counterbore aligned with said valve stem passage, said valve actuator comprising, in combination:

a housing adapted for connection to said bonnet, said housing having a pressure chamber and a flow port communicating with said pressure chamber for permitting the flow of control fluid into and out of said chamber;

a piston disposed in said pressure chamber for extension and retraction, said piston having an axially extending bore defining a pocket and having threaded coupling means;

a valve stem adapted for insertion through said bonnet valve stem passage for connection to said closure member, said valve stem having a coupling face engaging said piston;

a threaded rod disposed within said piston pocket and received in threaded engagement with said threaded coupling means, said threaded rod being connected to said valve stem; and, a drift collar adapted for threaded engagement with the threaded counterbore of said bonnet, said drift collar having a bore receiving said valve stem and having a coupling face defining a seat engagable by said piston, the axial position of said drift collar being adjustable relative to said bonnet and settable to maintain flush alignment of said drift collar face with said valve stem face.

* * * * *